(12) United States Patent
Guering

(10) Patent No.: US 8,152,103 B2
(45) Date of Patent: Apr. 10, 2012

(54) AIRCRAFT HOLD WITH DEPLOYABLE BENCH TO ACCOMMODATE BAGGAGE STOWAGE

(75) Inventor: Bernard Guering, Montrabe (FR)

(73) Assignee: Airbus Operations SAS, Toulouse (FR)

(*) Notice: Subject to any disclaimer, the term of this patent is extended or adjusted under 35 U.S.C. 154(b) by 282 days.

(21) Appl. No.: 12/597,990

(22) PCT Filed: Jun. 13, 2008

(86) PCT No.: PCT/FR2008/000819
§ 371 (c)(1),
(2), (4) Date: Oct. 28, 2009

(87) PCT Pub. No.: WO2009/007547
PCT Pub. Date: Jan. 15, 2009

(65) Prior Publication Data
US 2010/0219291 A1    Sep. 2, 2010

(30) Foreign Application Priority Data
Jun. 15, 2007  (FR) .................................. 07 04287

(51) Int. Cl.
*B64D 11/00* (2006.01)
*B64D 13/00* (2006.01)
(52) U.S. Cl. ............. 244/118.5; 244/118.1; 244/118.6
(58) Field of Classification Search ........... 244/118.1, 244/118.5, 118.6; 114/363
See application file for complete search history.

(56) References Cited

U.S. PATENT DOCUMENTS

| | | | | |
|---|---|---|---|---|
| 2,700,412 A | * | 1/1955 | Evans et al. | 297/232 |
| 3,314,720 A | * | 4/1967 | Millington et al. | 297/216.1 |
| 4,005,902 A | * | 2/1977 | Balin | 297/129 |
| 4,437,629 A | * | 3/1984 | Roine | 244/122 R |
| 4,679,749 A | * | 7/1987 | Ryan et al. | 244/122 R |
| 4,740,030 A | * | 4/1988 | Nordskog | 297/13 |
| 4,796,539 A | * | 1/1989 | Berrett | 108/55.1 |
| 4,869,445 A | * | 9/1989 | Jones et al. | 244/118.1 |
| 7,594,701 B2 | * | 9/2009 | Kawabata et al. | 297/452.63 |
| 2009/0159743 A1 | | 6/2009 | Guering et al. | |

FOREIGN PATENT DOCUMENTS

EP    0 233 739    8/1987

OTHER PUBLICATIONS

U.S. Appl. No. 12/595,045, filed Oct. 8, 2009, Guering.
U.S. Appl. No. 12/663,793, filed Dec. 9, 2009, Guering.

* cited by examiner

*Primary Examiner* — Tien Dinh
*Assistant Examiner* — Michael A Fabula
(74) *Attorney, Agent, or Firm* — Oblon, Spivak, McClelland, Maier & Neustadt, L.L.P.

(57) ABSTRACT

An aircraft hold including a floor having a substantially flat central part and a side part disposed along each longitudinal edge of the central part and inclined in relation thereto. The aircraft hold also includes at least one bench with a seat that can move between a position in which it is substantially parallel to the central part of the floor and a position in which it is folded against a wall of the hold.

7 Claims, 3 Drawing Sheets

AIRCRAFT HOLD WITH DEPLOYABLE BENCH TO ACCOMMODATE BAGGAGE STOWAGE

FIELD OF THE INVENTION

This invention relates to an aircraft hold intended to accommodate baggage.

BACKGROUND OF THE INVENTION

In an aircraft intended for the transport of passengers, the passengers carry a portion of their baggage along with them in the cabin of the aircraft, while the bulkier and heavier baggage travels in the hold. The latter baggage is transported to the aircraft with the aid of conveyors or on towed carts. There are conveyors making it possible to transport baggage up to the door of the hold of the aircraft. Placement inside the hold usually is performed manually. An operator grasps the bag arriving in the hold and goes to put it inside the latter. These operations for placing baggage in the hold are laborious. The hold is a relatively cramped space in which most of the time it is not possible to stand upright. Furthermore, certain bags can be heavy. Going to place the first bags at the back of the hold during loading of the baggage or else, during unloading of the baggage, going to look for the bags located at the back of the hold in order to remove them, is the most difficult.

All these difficulties in arranging the bags in the hold and in removing them therefrom make the time for loading and unloading of the passengers' baggage relatively long. The passengers, after getting off the aircraft, then have to wait for their baggage in the air terminal. For this reason, many passengers prefer to carry their bags, even some relatively bulky ones, along with them in the cabin, rather than have them travel in the hold.

To encourage the passengers to have their baggage travel in the hold, and to free up the cabin space, thus making it possible to enhance the comfort of the passengers during their trip and on boarding/deplaning, it is advisable to limit the waiting time for retrieval of the baggage having traveled in the hold.

Another difficulty is the placement of the baggage in the hold. Here it is advisable to plan for sufficient space in the hold to accommodate the baggage of all the passengers traveling on board the aircraft.

The document EP-0 233 739 relates to a multi-purpose extension for a pallet. There it concerns a device intended to be assembled on a pallet, itself intended to be positioned in a hold or a cargo airplane. This extension makes it possible to fit the shape of the wall of the hold and of the load transported.

The document U.S. Pat. No. 2,700,412 discloses folding seats intended to be arranged along the side walls of a hold of a cargo airplane.

The document U.S. Pat. No. 3,314,720 also relates to the transport of passengers—military personnel—in a cargo airplane. This document discloses, in particular, seats offering an enhanced safety for the passengers in the event of an accident, in comparison, for example, with the seats disclosed in the document U.S. Pat. No. 2,700,412.

BRIEF SUMMARY OF THE INVENTION

This invention then has as its purpose to provide a device making it possible to facilitate the task of the operators given the job of placing baggage in an aircraft hold and unloading this hold.

Another purpose of the invention is to provide means making it possible to unload the hold of an aircraft more rapidly in order to limit, or even eliminate, the waiting time for baggage when the passengers come to the air terminal upon their arrival.

Another purpose of the invention is to make it possible to optimize the loading of baggage in order to manage to store a greater number of bags in a hold.

To this end, this invention proposes an aircraft for the transport of passengers comprising a fuselage inside of which there extends a deck and a hold arranged under the said deck, the said hold comprising a floor having on the one hand a more or less level central part and on the other hand on each longitudinal edge of the central part each time a side part inclined in relation to the central part.

According to this invention, the hold comprises at least one bench having a seat movable between a position more or less parallel to the central part of the floor and a position folded back against a wall of the hold.

Such a bench can be used on the one hand to accommodate in seated position the operators who are handling the baggage, and on the other hand to accommodate baggage. In this way, the task of the operators is facilitated and furthermore it is possible to use the space situated above the inclined side parts of the floor to stack baggage, which is difficult to accomplish without a more or less horizontal base.

In an aircraft hold according to the invention, the benches can be assembled on vertical side walls of the hold, but each bench preferably is assembled on an inclined part of the floor of the hold, to make best use of the space in the hold.

An embodiment variant provides that the seat of the bench can be folded back in a position more or less parallel to the inclined part of the floor.

For a greater modularity of the hold, in order to be able to modify the distribution of the space reserved for containers and that reserved for baggage in the hold, each bench is divided so as to be able to deploy or to fold back bench seat portions independently of each other.

According to another advantageous form of this invention, each bench comprises a base forming, for example, a wall more or less perpendicular to the seat and extending from a longitudinal edge of the seat to the floor when the seat is in its deployed position more or less parallel to the central part of the floor, and the base advantageously is movable from its deployed position perpendicular to the seat to a folded-back position more or less parallel to a wall of the hold. This base, in its deployed position, then can connect the edge of the seat to the corresponding joining of the central part of the floor with an inclined part of this floor.

In a preferred embodiment of the invention, the base is articulated with a footrest which, in the retracted position of the bench, is accommodated against the inclined side part of the floor and which, in the deployed position of the bench, comes to partially cover the central part of the floor.

This invention furthermore relates to an aircraft comprising a hold, characterized in that the hold is a hold such as described above.

Details and advantages of this invention will emerge more clearly from the description that follows, given with reference to the attached schematic drawings.

DETAILED DESCRIPTION OF THE INVENTION

Figure 1:
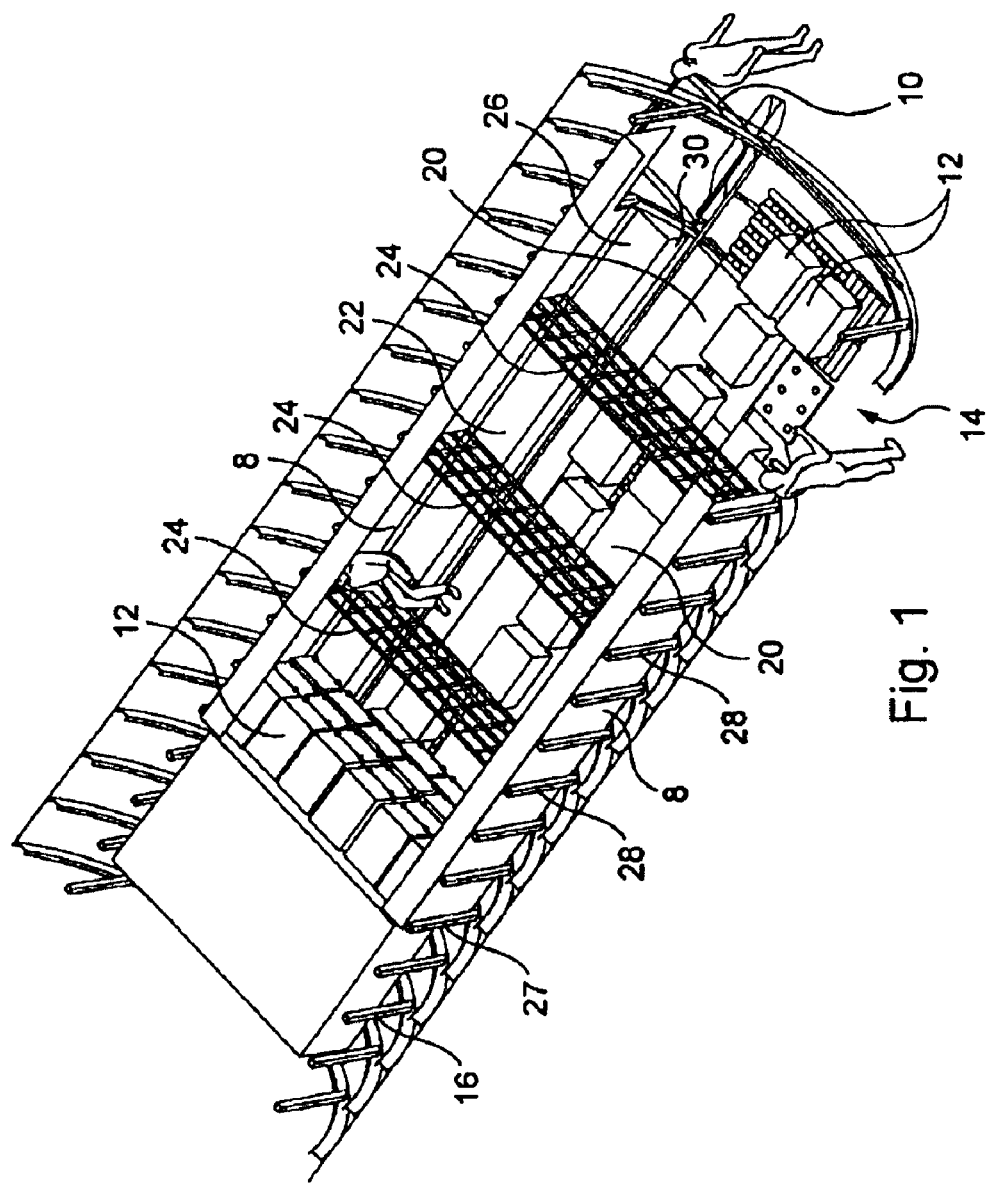
FIG. 1 shows an aircraft hold according to this invention.

The description that follows is given with reference to an aircraft intended in particular for the transport of passengers. This aircraft comprises a fuselage inside of which there extends a deck. The deck extends more or less horizontally and divides the fuselage into two zones: a passenger cabin above the deck and a hold underneath same. FIG. 1 shows a hold of such an aircraft.

A hold floor 2 is seen on this FIG. 1. This floor 2 is implemented in three parts: a more or less horizontal central part 4 and two raised side parts 6, inclined in relation to the central part 4. Of course, the references to horizontality and verticality in this description relate to the aircraft described when it is on the ground.

The hold also has more or less vertical side walls 8 that delimit the loading space of the hold. The ceiling of the latter is not visible here.

The hold shown on FIG. 1 comprises as access, on the one hand a baggage door 10 intended in particular for the loading and unloading of baggage 12 and on the other hand a container door 14. The latter is of sufficient size to allow, for example, the passage of a standard type LD3 container 16.

The hold shown on FIG. 1 is equipped with a freight loading system, also known under the name of CLS (English abbreviations for Cargo Loading System). The latter is provided for the moving of containers 16 in the hold. These are loaded and unloaded through the container door 14. The freight loading system comprises in particular rollers 18 (FIG. 3) on which the containers 16 moving in the hold come to slide. The rollers define a movement plane on which the containers 16 move. The latter are introduced into the hold through the container door 14 and pushed inside the hold. The freight loading system makes it possible to easily move the containers 16 toward the back of the hold in order to allow the introduction of other containers 16. Locking systems, not shown, make it possible to keep the containers 16 at the back of the hold during a flight. Such loading and locking systems are known to the individual skilled in the art and are not described in greater detail here.

In the example of FIG. 1, a container 16 is located at the back of the hold and the rest of the hold is intended to accommodate baggage 12. For loading of the hold, the baggage 12 is introduced into the hold, for example, through the baggage door 10. Innovative means then are provided for guiding this baggage 12 toward the back of the hold.

The means used here comprise two identical sets of conveyor belts 20. The conveyor belts 20 of one set are aligned one behind the other in the longitudinal direction of the aircraft on the central part 4 of the floor 2 of the hold. Between the two sets of conveyor belts 20 there is a row of rollers of the freight loading system.

These conveyor belts 20 each make it possible to move longitudinally in the hold of the aircraft one (or more) bags 12 placed thereon. A set of conveyor belts 20 thus makes it possible to move a bag 12 from the first conveyor belt located closest to the baggage door 10 to the last conveyor belt located at the other end of the set of conveyor belts, going from one conveyor belt 20 to the other.

It thus is provided to place the baggage 12 on the first conveyor belt of each of the sets of conveyor belts 20. This baggage 12 then is guided to the back of the hold. An operator located then arranges the baggage that he receives to form a wall of baggage, as shown on FIG. 1. One operator per set of conveyor belts 20 preferably is provided.

In order to facilitate the task of the operators placing the baggage at the back of the hold, benches 22 are provided at the inclined side parts 6 of the floor 2. These benches preferably are pliable so as not to hamper the passage of containers 16. These benches 22 also can be used to support baggage 12. As a matter of fact, instead of having the baggage 12 rest on the inclined parts of the floor 2 of the hold, this baggage is placed on benches 22 that preferably have a seat 26 more or less horizontal and parallel to the central part 4 of the floor 2 of the hold. In that way, the baggage stack created is more stable.

The conveyor belts 20 can be controlled individually. Thus on FIG. 1, the conveyor belt located farthest to the back of the hold of each set of conveyor belts and on which a wall of baggage 12 is located preferably is stopped. In this way, rubbing between the said conveyor belts and the baggage located at the bottom of the wall of baggage is avoided.

As the loading proceeds, the baggage forms walls of baggage. In order to secure this baggage and prevent it from falling over, it is provided to hang nets 24 crosswise in relation to the hold. These nets 24 preferably are rolled up on props 27 located at the side walls 8. These props 27 connect the floor of a cabin located above the hold to a primary structure of the aircraft. On FIG. 1 there are seen sections of components (generally called "framework" or "frame") of this primary structure on which the props 27 come to rest.

Each net 24 preferably is arranged at two props 27 corresponding to the same framework of the primary structure of the aircraft. A winding mechanism 28 then is mounted on the two corresponding props 27. A slot implemented in the corresponding side wall 8 facing a prop 27 allows passage of the net 24. A sheathing not shown is provided around the winding mechanism 28 to achieve watertightness around the latter and thus to ensure the continuity of the side wall. Each winding mechanism 28 accommodates, for example, a half-net. These half-nets then are pulled by the operators from each winding mechanism and meet at the center of the hold and are hooked to one another with the aid of hooks or other joining devices.

Figure 2:
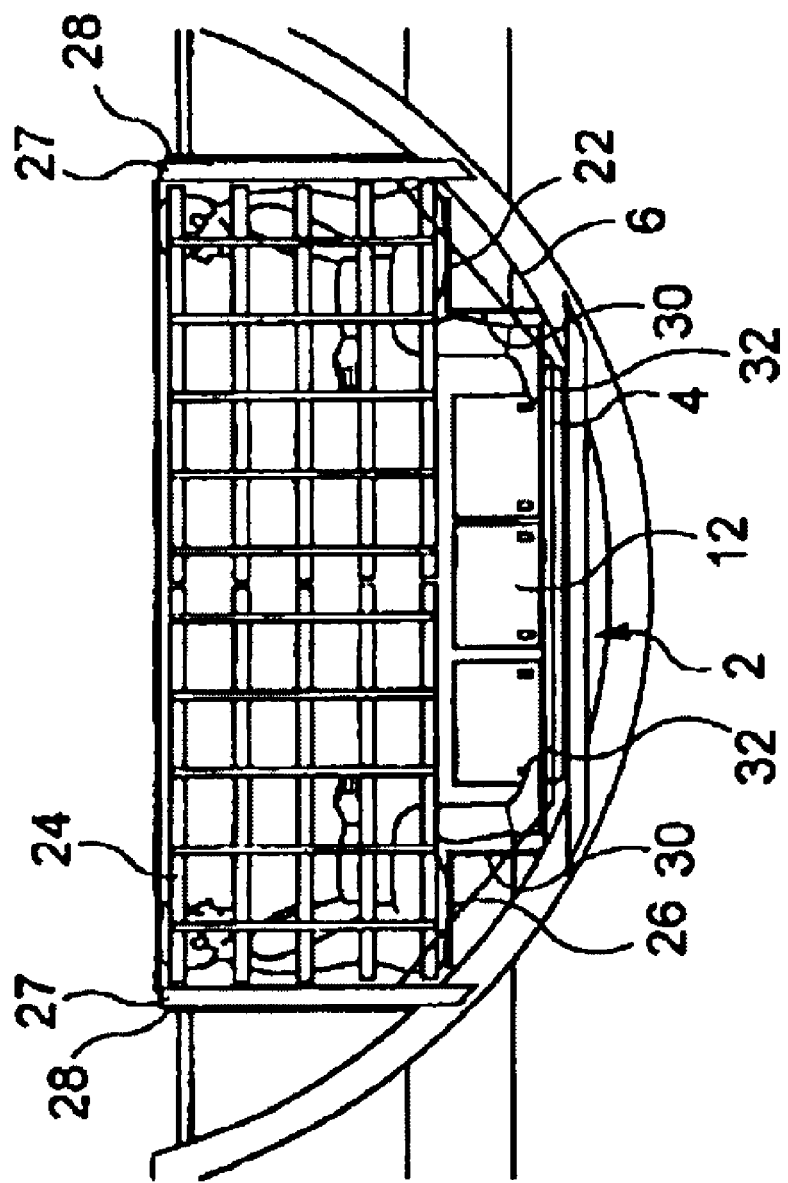
FIG. 2 is a front view of the hold of FIG. 1.

FIG. 2 shows the hold of FIG. 1 in a front view. The separation between the two half-nets is seen in the center. On this Figure, the benches 22 are in their usage position. The seat 26 of each bench 22 is more or less horizontal or, expressed differently, more or less parallel to the central part 4 of the floor 2 of the hold. This seat 26 then is used on the one hand to allow the operator (or operators) handling the baggage to sit down, and on the other hand to accommodate baggage.

Figure 3:
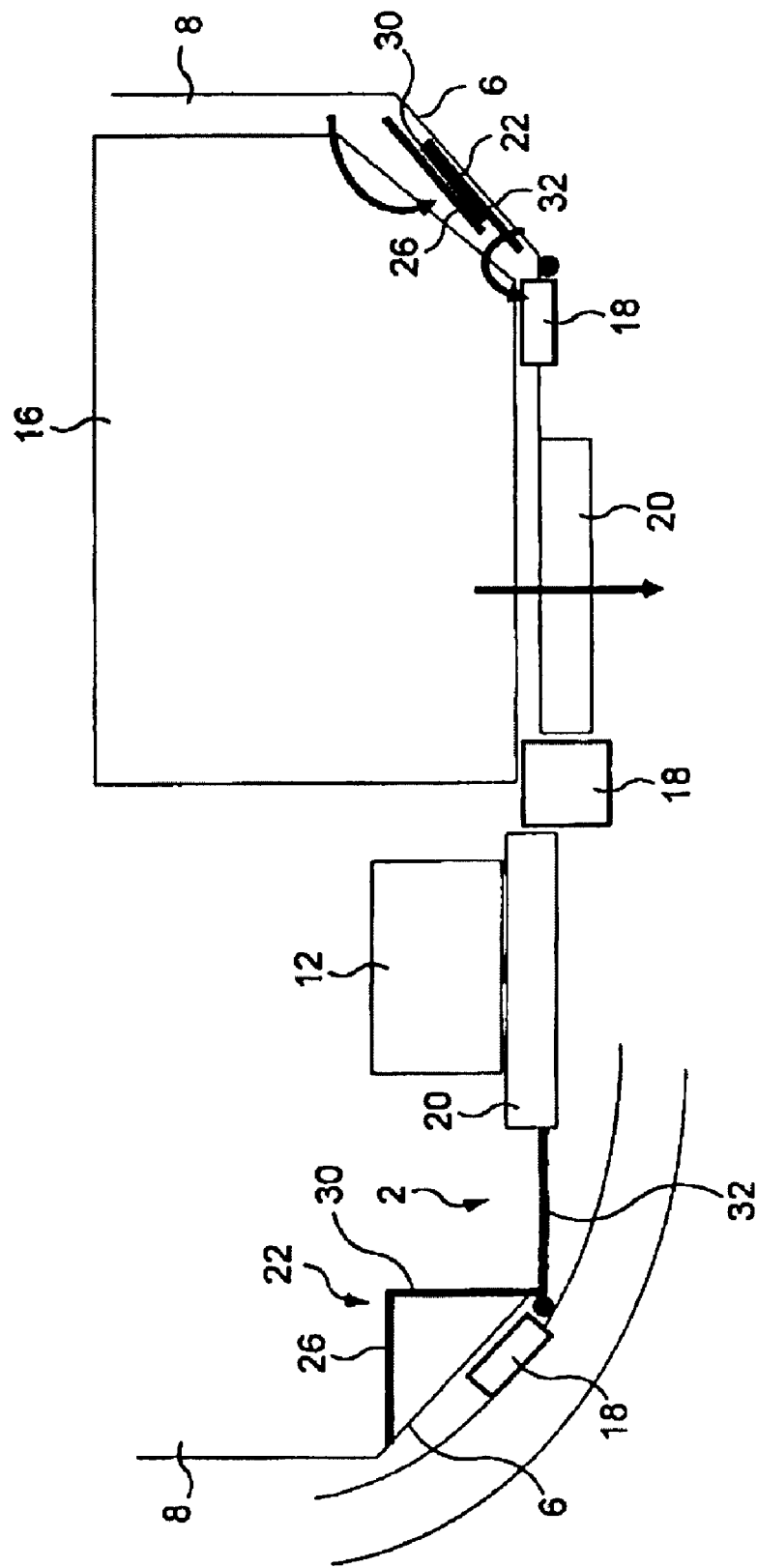
FIG. 3 is a schematic front view, on an enlarged-scale, of the hold of FIG. 1, the left portion of this Figure partially showing the hold according to this invention during a baggage loading/unloading, and the right portion of this Figure shows the said hold during the positioning of a container.

FIG. 3 is a front schematic view showing on one portion the conveying of a bag 12 and on the other portion the moving of a container 16, for example a standard type LD3 container.

On the left portion of FIG. 3, there are seen in particular a conveyor belt 20, rollers 18 of the freight loading system, a portion of the structure of the hold with its floor, as well as a retractable bench 22.

The conveyor belt 20 here (on the left portion of FIG. 3) is in its active position. The upper slack side of the belt is situated above the plane at which the moving of a container 16 takes place: this plane corresponds to the plane passing through the upper edges of the rollers 18 or else the bottom of a container 16 moving by rolling on these rollers 18 (cf. right portion of FIG. 3). The conveyor belt 20 then can transport a bag 12 without being hampered by the freight loading system of the hold.

On the left portion of FIG. 3, it is seen that the bench 22 is in its usage position. It thus has a seat 26 more or less horizontal or, expressed differently, more or less parallel to the central part 4 of the floor 2 of the hold. The seat 26 extends from a side part 6 of the floor, near the corresponding side wall 8, toward the center of the hold.

The bench 22 also comprises a base 30 that supports the seat 26. This base 30 is a wall, solid or with an openwork design, that extends more or less vertically from the edge of the seat 26 opposite the side part 6 of the floor on which the seat is assembled, to the floor 2, more or less at the joining between the central part 4 of the floor and the corresponding inclined side part 6. In that way, the base 30 forms a wall for the space accommodating the baggage 12 and preventing the latter from sliding under the seat 26 where it then would be more difficult to access.

Finally, bench 22 comprises a footrest 32 which in the deployed position of the bench 22 becomes positioned on the floor at the central part 4 thereof (left portion of FIG. 3) and which in the retracted position of the bench 22 comes to be accommodated along the inclined side part 6 of the floor (right portion of FIG. 3). This footrest 32 makes it possible to conceal and protect various elements of the freight loading system, such as, for example, locking means, guides, etc., against impacts and crushing. The fact of having a more or less level surface also makes it possible to limit the risks of stress for the baggage during loading thereof.

The seat 26 thus is assembled pivoting on the inclined side part 6 of the floor, in immediate proximity to the corresponding side wall 8. A first hinge connects the seat 26 to the base 30 and a second hinge connects the base 30 with the footrest 32.

As symbolized by three arrows on the right portion of FIG. 3, in order to change over from the configuration on the left of FIG. 3 to that on the right of FIG. 3, the conveyor belts 20 are lowered, the rollers 18 are moved and the bench 22 is retracted. In order to retract the bench 22, the footrest 32 comes to be slid under the seat 26. In this movement, the footrest 32 comes to slide along the inclined side part 6 of the floor, bringing about on the one hand the pivoting of the base 30 in relation to the footrest 32, and on the other hand the pivoting of the seat 26 in relation to the base 30.

It is seen that this bench 22 is stable in its retracted as well as deployed position. A simple locking therefore is sufficient for holding it in these two positions.

On the right portion of FIG. 3, the conveyor belts 20 are inactive and the rollers 18 of the freight loading system are used for the movement of an LD3 type container 16. As for the bench 22, it is retracted. The base 30 is articulated in relation to the floor 2 and becomes folded back along the corresponding inclined side part 6, while the seat 26 becomes folded back over the top of the base 30 and thus also is situated more or less parallel to the corresponding side part 6.

The conveyor belts 20 here are in their lowered position. The upper slack side of these belts is situated below the plane of movement defined above. The container 16 can pass without being hampered by the conveyor belts 20. The conveyor belts 20 also assume this position when they are supporting a wall of baggage 12. The construction of these conveyor belts 20 makes it possible for them to carry a considerable load, and solid supports on the primary structure of the aircraft are provided to accommodate each conveyor belt 20 in its lowered position.

The bench 22 here is retracted in order not to hamper passage of the container 16. This bench 22 is not useful during loading or unloading of the containers 16. It therefore is not bothersome since it is folded back.

For a better modularity of the hold, that is, in order to allow the hold to accommodate a variable number of containers 16 and to adapt the space to accommodate baggage 12, it is advantageous that the length of a conveyor belt 20, or more precisely the distance between two conveyor belts 20, corresponds to the width of a container 16 adapted to the hold (the length of the conveyor belt 20 and the width of a container 16 are each measured in the longitudinal direction of the aircraft). Thus, when several containers 16 are loaded on board the hold, the conveyor belts 20 situated beneath the containers 16 remain in lowered position and the other conveyor belts 20 ensure conveyance of the baggage 12 up to the containers 16.

Likewise, it preferably is provided that the bench 22 is divided into several portions of benches 22 on each side of the hold. Each portion of bench 22 can be deployed or folded back independently of the other portions of benches. Here also, measured in the longitudinal direction of the aircraft, the length of a portion of bench 22 is a multiple of the width of a container 16. Advantageously, a portion of bench has a length corresponding to double the width of a container 16. In this way, the deployment and folding back of portions of benches 22 is accomplished more rapidly than for portions of benches the length of which might correspond to the width of a single container.

As emerges from the preceding description, the hold according to the invention is adapted for receiving only baggage or else also for accommodating baggage and containers at the same time. The hold according to the invention can take on a number of configurations. The number of containers carried along in the hold can be variable.

A hold such as described saves the personnel given the job of placing the passengers' baggage in the hold of the aircraft from carrying (or throwing) the baggage toward the back of the hold. The baggage can be transported by a belt or other means up to the hold, where it is guided—automatically—on the conveyor belts 20 toward the back of the hold. Operators at the back of the hold receive the bags and stack them up. As the loading progresses, the conveyor belts are lowered and stopped.

During this loading/unloading operation, the benches present in the hold allow the operators to work under better conditions, less laboriously and therefore more efficiently. The benches 22 advantageously are provided over the entire length of the hold intended to accommodate baggage 12. In this way, the operators can choose the most appropriate place during loading and unloading and move in "continuous" manner according to the volume of baggage situated in the hold. This continuity of the benches also can be used when the seats of the benches are bearing baggage.

The benches in their deployed position also make possible a better utilization of the space in the hold intended for the placement of baggage, because the latter can be stacked up more easily to form walls of baggage.

The device according to the invention also makes it possible to save considerable time for the loading and unloading of baggage.

The benches proposed here have a limited additional weight for the aircraft. In that way, their mass does not disadvantage the overall mass of the aircraft too heavily.

Of course, this invention is not limited to the preferred embodiment described above by way of non-limitative example. It also relates to all the embodiment variants within the capacity of the individual skilled in the art in the context of the claims below.

Thus, for example, the benches used could be folded back differently. One could have, for example, a bench the seat of which is turned up and which, when the bench is not being used, is situated along a side wall (more or less vertical). The base likewise preferably is constituted by a wall that makes it possible to prevent baggage or other objects from sliding under the seat. Simple profiled legs—such as chair or table legs—could be considered, for example, to streamline the device.

Finally, this invention is described in combination with conveyor belts and holding nets. It also can find application in a hold of the prior art, not equipped with these innovative arrangements.

The invention claimed is:

1. An aircraft for transport of passengers comprising:
   a fuselage inside of which a deck extends; and
   a hold arranged under the deck, the hold comprising a floor including a substantially level central part, and on each longitudinal edge of the central part, a side part inclined in relation to the central part is joined,
   the hold further comprising at least one bench including a seat movable between a deployed position substantially parallel to the central part of the floor and a position folded back against a wall of the hold,
   wherein each bench is assembled on an inclined side part of the floor of the hold.

2. An aircraft according to claim 1, wherein a seat of the bench can be folded back into a position substantially parallel to the corresponding inclined side part of the floor of the hold.

3. An aircraft according to claim 1, wherein each bench is divided so as to be able to deploy and/or fold back portions of the bench seat independently of each other.

4. An aircraft according to claim 1, wherein each bench comprises a base forming a wall substantially perpendicular to the seat and extending from a longitudinal edge of the seat to the floor when the seat is in a deployed position substantially parallel to the central part of the floor, and the base is movable from its deployed position perpendicular to the seat to a folded-back position substantially parallel to the corresponding inclined side part of the floor of the hold.

5. An aircraft according to claim 4, wherein the base, in its deployed position, connects the edge of the seat to the joint of the corresponding central part of the floor with the inclined side part of the floor.

6. An aircraft according to claim 4, wherein the base is articulated with a footrest which, in the retracted position of the bench, is accommodated against the inclined side part of the floor and which, in the deployed position of the bench, partially covers the central part of the floor.

7. An aircraft according to claim 1, wherein a passenger cabin is laid out above the deck.

* * * * *